Sept. 6, 1955  E. V. DARDANI  2,717,006
SWEEPSTICK FOR LOOMS AND SELF-ALIGNING BEARING THEREFOR
Filed Oct. 31, 1952
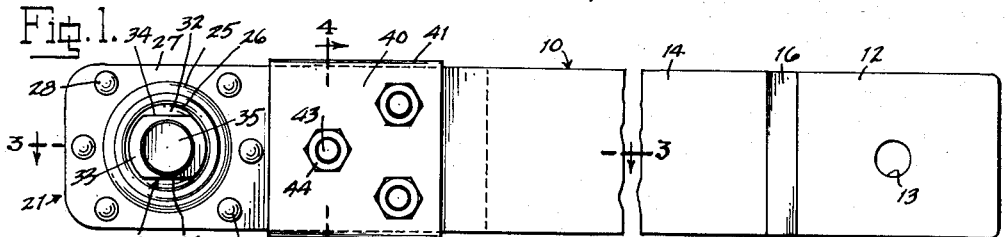
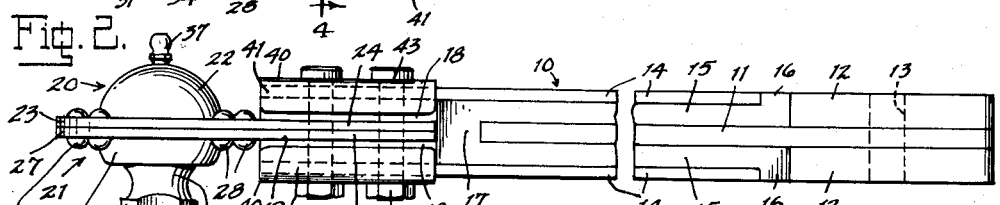
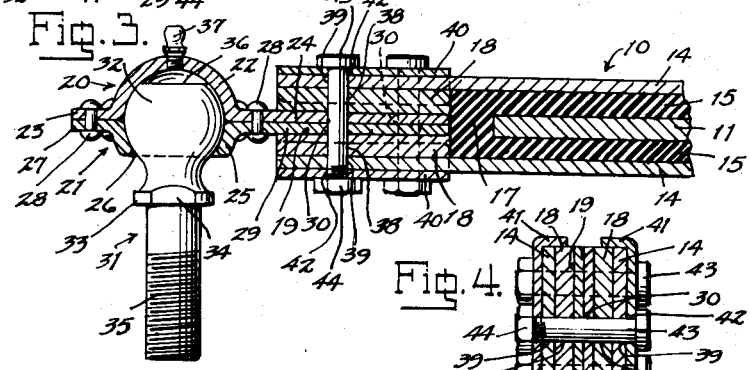
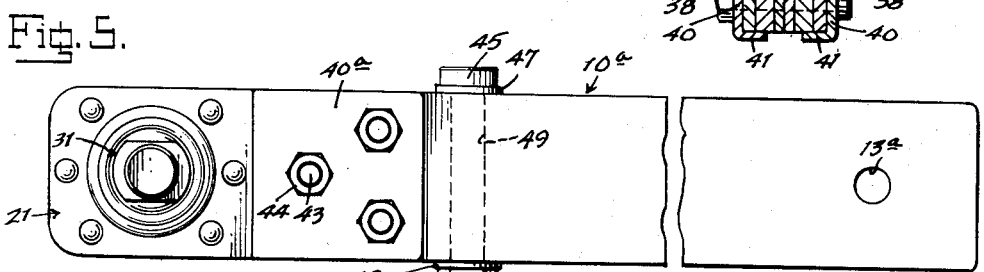
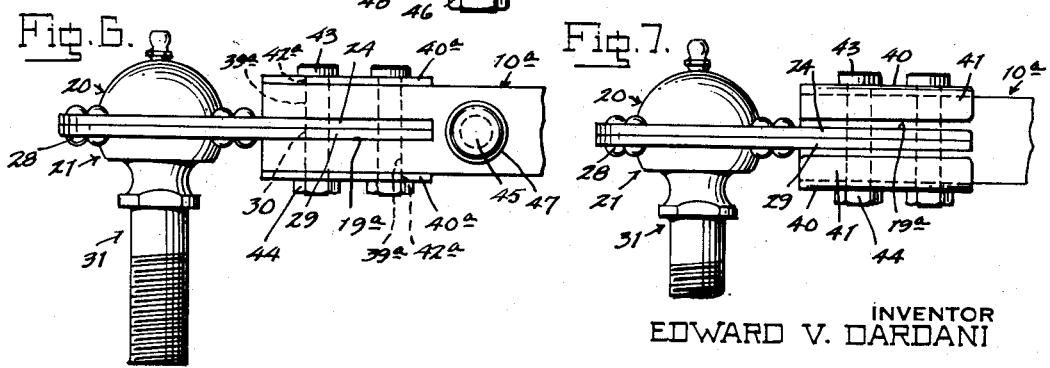
INVENTOR
EDWARD V. DARDANI
BY
ATTORNEY.

United States Patent Office 2,717,006
Patented Sept. 6, 1955

2,717,006

SWEEPSTICK FOR LOOMS AND SELF-ALIGNING BEARING THEREFOR

Edward V. Dardani, Fairfield, Conn., assignor to The Heim Company, Fairfield, Conn., a corporation of Connecticut Application October 31, 1952, Serial No. 317,894

1 Claim. (Cl. 139—151)

The present invention relates to an improved sweepstick for looms and self-aligning bearing therefor, and is a continuation-in-part of my application for "Sweepstick for Looms and Self-Aligning Bearing Therefor," Serial Number 289,373, filed March 22, 1952. In said application, there is disclosed a self-aligning bearing adapted to be clampingly secured about the end of a sweepstick, with the central plane of the bearing substantially in the central plane of the sweepstick, so that the impact force is most efficiently directed along the central axis of the sweepstick.

It is proposed in the present invention to provide a substantially similar self-aligning bearing having an attaching extension disposed in the central plane of the bearing, and adapted to be clampingly secured within a centrally disposed slot in the end of the sweepstick by clamping engagement of the sweepstick at each side thereof, thus assuring a positive clamping connection without regard to the particular thickness of the sweepstick.

In a power loom the sweepstick is the link or connector between the picking cam and the picker stick for imparting swinging movement to the latter, the movement of the picker stick serving to impel or throw the shuttle across the raceway or lay of the loom. The shuttle must obtain its acceleration to carry it across the lay in only the relatively short distance through which the sweepstick and the picker stick move, and consequently the movement imparted to these parts by the cam must be very rapid and with great force, resulting in considerable impact strain on the sweepstick.

As a power loom operates at speeds ranging from 120 to 250 picks per minute, the strain imposed upon the conventional sweepstick is severe and results in a comparatively short use before replacement is necessary, due to breakage or wear. This is in part due to the fact that the sweepstick is formed of a shock-absorbing material rather than of metal, usually consisting of a length of hard closegrained wood, and in some cases of laminated wood and rubber, as well as laminated rubber-impregnated fabric material. Furthermore, the loom mechanism is such that the picker stick, which is engaged at its upper end in the shuttle box at the end of the lay, must swing with the movement of the lay, so that in addition to its swinging movement to impel the shuttle it also swings with the lay at right angles to its shuttle impelling movement. Consequently, the connection of the sweepstick with the cam mechanism must be such as to compensate for misalignment in the stud bearing. In the conventional sweepstick, this misalignment is provided for by engaging the stud of the cam arm in an oversized hole in the sweepstick, and due to the repeated forward and rearward impact of the stud in the hole, it tends to become elongated longitudinally of the stick, this being the primary reason for frequent replacement of the sweepstick.

It is proposed in the present invention to provide an improved bearing between the stud and the sweepstick which is self-aligning to compensate for misalignment of the sweepstick, and further to provide a rigid connection of the bearing with the sweepstick designed to take the impact strain longitudinally of the stick in both forward and rearward directions, and to so distribute the strain to the shock-absorbing structure of the sweepstick that there will be little or no tendency to wear away the material of the sweepstick with consequent loosening of the bearing.

With the above and other objects in view, an embodiment of the invention is shown in the accompanying drawings, and this embodiment will be hereinafter more fully described with reference thereto, and the invention will be finally pointed out in the claim.

In the drawings:

Fig. 1 is a side elevation showing the inner side of the sweepstick, according to one illustrated exemplary embodiment of the invention;

Fig. 2 is a top plan view;

Fig. 3 is a horizontal sectional view taken along the line 3—3 of Fig. 1;

Fig. 4 is a vertical sectional view, taken along the line 4—4 of Fig. 1;

Fig. 5 is a side elevation showing a modification of the invention;

Fig. 6 is a horizontal sectional view taken along the line 6—6 of Fig. 5; and

Fig. 7 is a top plan view of another modification of the invention.

Similar reference characters indicate corresponding parts throughout the several figures of the drawings.

The sweepstick 10 may be of various materials suited for the purpose, as, for instance, a length of hard closely grained wood, such as hickory, laminated rubber, impregnated fabric, etc. In Figs. 1–3 of the present disclosure, because of the particular adaptability of the present invention thereto, the sweepstick is illustrated as of a type comprising laminations of wood and rubber. A similar type of sweepstick is disclosed in the patent to J. Edgar Moe for "Sweepstick," No. 2,445,745, dated July 20, 1948. In particular, this specific type of sweepstick is in the form of an elongated bar of rectangular cross-section, and consists of an intermediate longitudinally extending layer of wood, metal, or other relatively inflexible hard material 11 having outer layers 12—12, also of similar inflexible hard material, secured upon one end portion thereof, as by cementing or the like, this three layer end portion of the sweepstick being provided with a transverse hole 13 for attachment of the lug strap or the like of the picker stick, as is usual in the installation of a sweepstick in a loom. The intermediate layer 11 extends from the inner ends of the layers 12—12 and a pair of longitudinally extending layers 14—14, also of inflexible hard material similar to the layers 11 and 12—12, are disposed in parallel spaced relation to the intermediate layer 11 with their inner ends longitudinally spaced from the ends of the layers 12—12 and with their outer ends projecting substantially beyond the outer end of the intermediate layer 11.

A body of rubber or other similar elastic and resilient material 15 is interposed between the intermediate layer 11 and the layers 14—14, this material extending as layers or laminations longitudinally between the layers 11 and 14—14, and also extending outwardly between the opposed ends of the layers 14—14 and 12—12, as at 16—16, and about the outer end of the intermediate layer 11, as at 17. The face of the end portion 17 is flat and transversely disposed, and is inwardly spaced from the outer ends of the layers 14—14, and at the inner sides of the projected end portions of the layers 14—14 there are provided filler blocks 18—18 formed of wood, aluminum, hard rubber, or other suitable material, and which constitutes a substantially rigid part of the outer layers 14—14, these blocks being spaced apart at their inner sides to provide an open-ended slot 19 in the central plane of the end of the sweepstick.

The self-aligning bearing is adapted, as will presently more fully appear, to be rigidly secured in the slot 19 between the filler blocks 18—18 and the projected end portions of the layers 14—14. The self-aligning bearing assembly comprises two complementary socket forming members, indicated generally as 20 and 21, the member 20 consisting of a semi-spherical socket portion 22 and a web portion 23 surrounding the portion 22 and having its inner flat surface in the central plane of the bearing and projecting forwardly and rearwardly from the socket portion 22. Additionally, the web portion 23 is provided with a flat extension 24 disposed in co-planar relation therewith and constituting a part of the attaching means of the bearing, as will presently more fully appear.

The member 21 comprises a semi-spherical socket portion 25 complementary to the socket portion 22, and provided with a central aperture 26 and a web portion 27 extending forwardly and rearwardly from the socket portion and having its inner flat surface also in the central plane of the bearing and secured to the web portion of the member 20 by spaced rivets 28 arranged in concentric relation about the socket portions 22 and 25. It will be understood that instead of the rivets, the web portions may be secured by brazing, spot welding, or other suitable methods. Like the member 20, the web portion 27 of the member 21 is provided with a co-planar extension 29 complementary to the extension 24, the two extensions constituting a double thickness attaching tongue adapted to be inserted in the slot 19 of the sweepstick.

To this end, the tongue is substantially rectangular in outline, its width corresponding to the width of the sweepstick and its length substantially corresponding to the depth of the slot 19. Also, the thickness of the tongue corresponds to the width of the slot, this width being determined by the thickness of the filler blocks 18—18. The tongue is provided with suitably spaced holes 30 for receiving clamping bolts, as will presently more fully appear.

Prior to securing together the socket members 20 and 21, a stud member, generally indicated as 31, is secured in the bearing, this stud member comprising a ball end 32 rotatably engaged for universal swiveling action within the complementary socket members 22 and 25, a flanged portion 33 having flat sides 34 for engagement by a wrench, and a threaded shaft portion 35 for engagement in a hole provided in the picker arm of the sweep stick driving mechanism of the loom where it is secured by a nut.

In order to lubricate the bearing, a lubricant space is provided within the socket portion 20, this space being provided by forming a flat surface 36 upon the ball end 32 of the stud in diametrically opposed relation to the shaft portion 35. Lubricant is supplied to the space by a check valve type of lubricant fitting 37 screwed into the wall of the socket portion 22.

The bolt holes 30 of the tongue extension are three in number and are disposed in staggered relation in the transverse direction of the sweepstick so that one bolt hole is not in longitudinal line with another. Registering bolt holes 38 and 39 are respectively provided through the filler blocks 18 and the projecting end portions of the layers 14—14, and upon each of the outer sides of said end portions there is engaged a clamping plate 40 having side flanges 41—41 and having bolt holes 42 also in register with the holes 30 of the tongue extension. Bolts 43 are engaged through the registered bolt holes and have nuts 44 screwed upon their projecting ends, and which, upon being tightened, clamp the clamping plates 41 at each side and thus clamp the tongue extension of the bearing assembly in the slot 19. The flanges 41 of the clamping plates 40 constitute confining means for the end portions of the sweepstick to insure against any possibility of splitting of the wood of the layers 14—14 and the filler blocks 18—18.

In operation, the driving impact from the sweep arm of the pick shaft attached to the stud member 31 is imparted by the stud member directly to the web portions 23 and 27 and the extension portions 24 and 29 constituting the tongue extension, the force of this impact being substantially in the central plane of the sweepstick and being distributed through the bolts 43 and the clamping plates 40 through the relatively non-yielding outer layers 14—14, and thence through the resilient body 15 to the non-yielding intermediate layer 11 and the end portions 12—12, which, being connected by a lug strap to the picker stick, imparts movement to the latter.

In Figs. 5 and 6 there is illustrated a modified form of the invention in which the sweepstick 10a is in the form of a solid piece of hard wood, such as hickory, provided at one end with a hole 13a for attachment of the lug strap and at its other end with an open-ended slot 19a disposed in its central plane and receiving the tongue extension of the bearing assembly. In this form of the invention, the clamping plates 40a are not provided with side flanges such as the flanges 41 of the first embodiment, but are simply rectangular plates having their side edges flush with the side edges of the sweepstick.

These plates have bolt holes 42a registering with the holes 30 of the tongue extension and the end portions of the sweepstick at each side of the slot 19a are provided with bolt holes 39a also in register with the holes 30. The bearing assembly is clamped in place in similar manner to the first embodiment by clamping bolts 43 having nuts 44 screwed upon their ends.

A vertically disposed clamping bolt 45 provided with a tightening nut 46 and washers 47 and 48 is engaged through a passage 49 in the sweepstick disposed in its central plane and at right angles to the bolts 43, this bolt being for the purpose of insuring against the possibility of splitting the wood through longitudinal strain imposed by the bolts 43.

In Fig. 7 there is shown a modified arrangement in which the sweepstick 10a of solid hard wood is employed, and in which the clamping plates 40 having side flanges 41 are engaged about the upper and lower sides of the end portion of the sweepstick in similar manner to the first embodiment. In this arrangement the bolt 45 is dispensed with, as the flanges 41 serve to insure agains splitting of the wood.

I have illustrated and described preferred and satisfactory embodiments of my invention, but it will be understood that changes may be made therein, within the spirit and scope thereof, as defined in the appended claim.

What is claimed is:

In combination, a sweepstick for looms, said sweepstick consisting of an elongated bar of rectangular cross-section having relatively narrow horizontal top and bottom surfaces and relatively wide vertical side surfaces and having an open end slot in one end centrally of and parallel to said side surfaces and extending between said top and bottom surfaces, and a bearing assembly connected to an end of said bar, comprising a pair of complementary socket-forming members, each having a vertical rigid web portion disposed longitudinally outwardly beyond the end of said bar and having a flat inner surface, said inner flat surfaces being in contact with each other in a vertical plane coincident to the longitudinal central vertical plane of said bar, means rigidly joining said web portions together with said flat inner surfaces in contact, each of said web portions having a socket portion complementary one to the other to form a spherical socket having its center point coincident to both the central horizontal plane of said bar and said central vertical plane thereof, at least one of said socket-forming portions having a central stud-receiving opening having its axis normal to said central vertical plane, and each of said web portions having an integral rigid co-planar tongue extension extending inwardly beyond the end of said bar in parallel relation to said side surfaces, said extensions having their flat inner surfaces in contact and being engaged within said slot of said bar with their outer surfaces in contact with the side surfaces of said slot, horizontal clamping bolt means extending transversely through said bar and said tongue extensions and securing said bearing assembly to said bar, and a ball end stud member engaged for free swiveling movement in said spherical socket and extended transversely outwardly through said stud-receiving opening.

References Cited in the file of this patent

UNITED STATES PATENTS

| | | |
|---|---|---|
| 587,912 | Atwood | Aug. 10, 1897 |
| 1,038,166 | Mac Williams | Sept. 10, 1912 |
| 1,659,000 | Pearson | Feb. 14, 1928 |
| 2,110,105 | Burdett | Mar. 1, 1938 |
| 2,333,377 | Huffman | Nov. 2, 1943 |
| 2,445,745 | Moe | July 20, 1948 |
| 2,601,875 | Dardani | July 1, 1952 |